US006789136B1

(12) United States Patent
Dunstan (10) Patent No.: US 6,789,136 B1
(45) Date of Patent: Sep. 7, 2004

(54) EFFICIENT METHOD TO OBTAIN DEVICE ADDRESSES FROM DEVICES ON A BUS

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 09/752,868

(22) Filed: Dec. 29, 2000

(51) Int. Cl.[7] .................................................. G06F 3/00
(52) U.S. Cl. ............................ 710/8; 710/9; 710/104
(58) Field of Search ........................ 710/8, 9, 10, 104, 710/300, 305, 26; 713/1

(56) References Cited

U.S. PATENT DOCUMENTS

| 4,660,141 A | * | 4/1987 | Ceccon et al. ................. 710/9 |
| 5,313,595 A | * | 5/1994 | Lewis et al. ................. 710/305 |
| 5,428,752 A | * | 6/1995 | Goren et al. ................. 710/300 |
| 5,761,697 A | * | 6/1998 | Curry et al. ................. 711/100 |
| 6,092,138 A | | 7/2000 | Schutte |

OTHER PUBLICATIONS

*System Management Bus Specification,* Smart Battery System Specifications, SBS Implementers Forum Version 1.1, Copyright 1996, 1997, 1998.

* cited by examiner

Primary Examiner—Khanh Dang
(74) Attorney, Agent, or Firm—Blakely, Sokoloff, Taylor & Zafman LLP (57) ABSTRACT

A requesting device sends a request, intended to read one or more device addresses on a line of a bus. One or more sets of commands are then sent by the requesting device, where each set of commands is intended to read one device address. If, while a first device is writing its device address, the line fails to display any of the driven bit values of the first address, because the second device is simultaneously writing a second address on the line in response to the request, then the first device stops writing the first address. The first device does not write the first address again until after the second device has finished writing the second address. The first and second addresses uniquely identify the first and second devices.

21 Claims, 6 Drawing Sheets

EFFICIENT METHOD TO OBTAIN DEVICE ADDRESSES FROM DEVICES ON A BUS

BACKGROUND OF THE INVENTION

This invention is generally related to communication buses and more particularly to techniques for obtaining device addresses from devices connected to the same set of bus conductors.

Communication buses are widely used in electronic systems to expand the functionality of the system, by allowing multiple devices to communicate with each other and the system through the same bus. The bus allows the flexibility of adding or removing devices to change the capability of the system. Typically, each device has knowledge of its own device address that has been either assigned to it by the system or that was fixed at the time of manufacture of that device. In many cases, it is necessary to routinely identify all devices that are connected to the bus, such as upon system startup, so that the system can update its knowledge of its capabilities.

One way to find out the identity of the devices that are connected to a bus is to probe each possible device address. This may be done by having a requesting device, which is connected to the bus, send a separate request on the bus for each possible device address, and then wait after sending each request for a responding device to respond. The requesting device may do so on its own initiative or in response to a system host that is using the requesting device as a proxy. If no device responds to a request-address combination, then the requestor can conclude that there is no device on the bus at that address. Such a technique, however, can be very time consuming if there are a large number of possible device addresses to go through. Moreover, since each device is connected to the same set of bus conductors (or lines) on which all of the requests are placed, the probing technique may lead to unexpected and potentially damaging side effects because there is an increased chance that a device misunderstands one of the many different requests it receives and responds improperly or unexpectedly.

DETAILED DESCRIPTION

Figure 1:
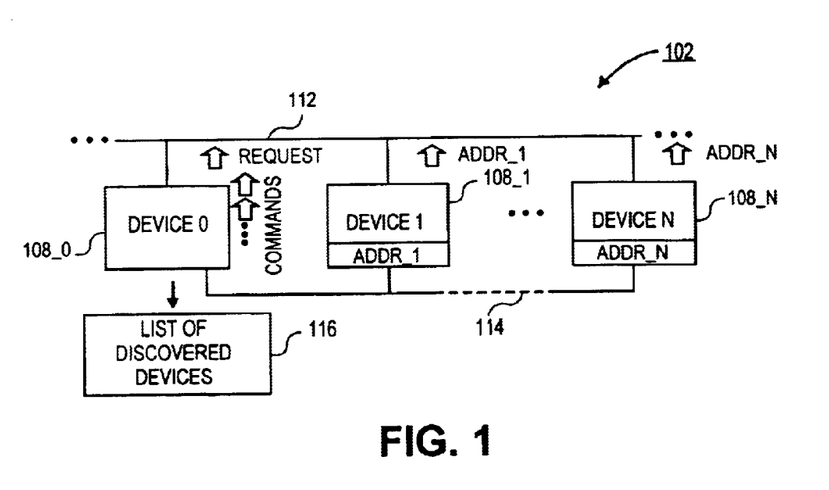
FIG. 1 illustrates a block diagram of an electronic system with multiple devices connected to the same set of bus conductors.

According to an embodiment of the invention, a method is provided for discovering a bus, i.e. obtaining device addresses from devices that are connected to a bus. The method is efficient in that the devices connected to the bus can be identified much faster than using the conventional probing technique described above. Moreover, the method can be efficiently implemented using only a single conductor (line) on which all of the bus signals needed for implementing the method can travel. FIG. 1 illustrates a block diagram of an electronic system 102 with multiple devices 108_0, 108_1, ... 108_N being connected to the same line 112 of a set of bus conductors. The set of bus conductors may be one or more lines. An optional bus line 114 for an event bus may be provided, as will be described below in connection with certain embodiments that allow for immediate system interrupt capability. It is understood that a "one line" or one wire bus refers to a system in which a return path is separately provided. The one-line embodiment may be implemented by an actual pair of identical signal conductors on which differential bus signals travel, or by a signal conductor and a ground plane.

Each device 108 has a unique device address which may be assigned by the system 102 or may be fixed at the time of manufacture of the device. Communication between the devices may be according to a wide range of higher level protocols which are enhanced with the bus discovery method described below.

For the embodiment in which the line 112 is nothing more than a single line serial link, the same wire may be used for conventional functions such as wake up, self clocking, as well as data transfer, without requiring any additional control lines. However, optional control lines such as line 114 may be added, where this may be a separate clocking signal line or a side band alerting line, if desired, for the particular system application. Using such additional lines may simplify the logic in the various devices 108, where the tradeoff is that additional pins are needed to connect each device.

The electronic system 102 may be any type of small, portable electronic device, such as a personal digital assistant, a mobile telephone unit or a portable notebook computer. The devices 108 may be different components in the system, including system manageability devices, intelligent battery modules, system control devices, as well as monitoring devices such as temperature or fan speed detection devices. The line 112 may be formed in a printed wiring board, and each of the devices in the system 102 could be in a separate chip on the board. Each device may have a controller in which a software device driver is executed to access the line 112 to initiate the bus discovery technique disclosed here.

The higher level functionality in a device may be a hardware-only based implementation or may include a combination of hard wired logic and a programmed microcontroller. Thus, for certain embodiments of the invention in which a programmed machine, such as a microcontroller, is used, some of the operations of the methods described below may be implemented as instructions stored in a machine readable medium such as any type of solid state memory, where such instructions once executed by a processor will cause the listed operations of the bus discovery method to be performed.

Figure 2:
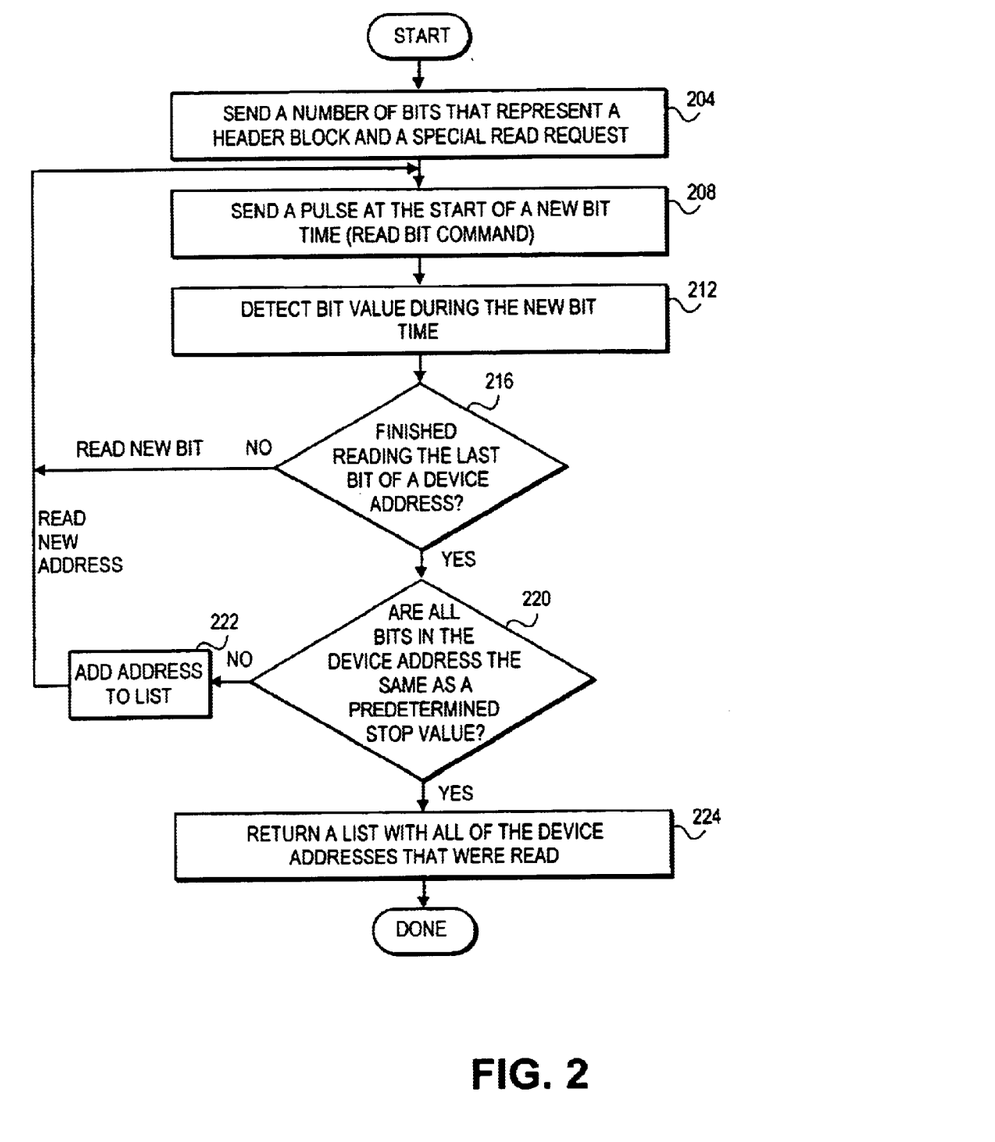
FIG. 2 shows a sample flow diagram of operations in a requesting device to identify other devices connected to the bus.

Turning now to FIG. 2, a method according to an embodiment of the invention is described in a flow diagram form. The operations shown in FIG. 1 are those that are performed in a requesting device to identify other devices that are connected to the line 112. Operation begins with the requesting device sending a request which is intended, and is recognized by all other devices, to read device addresses. In the particular example shown, a header block and a special read request are sent on the line (block 204.) Operation then proceeds with the requesting device sending a command intended to read one bit of a device address, by sending a pulse at the start of a new bit time, where the pulse is understood by all of the other devices as referring to a read bit command (block 208.) Operation then proceeds with a bit value being written by a responding device and detected by the requesting device during the new bit time (block 212.)

Each of the devices, including the requesting device, that are connected to the line 112 are aware of the number of bits that define a device address. Accordingly, if the requesting device recognizes that it has finished reading the last bit of a device address (block 216), then operation proceeds with determining whether all of the bits in the device address are the same predetermined stop value, where this predetermined stop value may be a logic '1' or a logic '0' depending on how the value is defined by its signal level on the line (block 220.) If yes, then the requesting device recognizes that there are no more devices connected to the line that wish to identify themselves, and accordingly is ready with a list that has all of the device addresses which have been read (block 224.) This list may then be returned to a calling subroutine of the system, or other mechanism which initiated the request to discover the bus.

Returning to block 216, if the requesting device determines that it has not finished reading the last bit of a device address, then it loops back to block 208 to send a new pulse (read command) at the start of the next bit time, in an attempt to read the next bit of the address.

In block 220, if all bits in the device address are not the same predetermined stop value, then the requesting device assumes that the address is a valid address of a device connected to the bus, and accordingly adds this address to the list (block 222.) The requesting device then loops back to block 208 to attempt to read a new address.

Note that in this scheme, the requesting device and all of the other devices on the bus recognize how many bits define a device address and can accordingly detect when a new address is to be read. For instance, if the device address consists of eight bits, then each device connected to the bus recognizes the start of a new address every eight bit times. This synchronization between the requesting device and the other devices connected to the bus may be performed according to any suitable timing negotiation phase that precedes the "message" phase which begins with sending the header block and the special read request in block 204. Alternatively, knowledge of each bit time may be preconfigured at the time of manufacture of each of the devices, such that essentially no timing negotiation is necessary prior to the message phase. As another alternative, the duration of each bit time may be communicated to each device over one or more other lines of the bus. This would be a so-called multi-line embodiment. In addition, it should be noted that in the single-line embodiment, the start of each bit time may be specified by the initial edge of the pulse sent by the requesting device in each command (see the timing diagram of FIG. 6 for an example of such an embodiment.) In contrast, in the multi-line embodiments, the start of each bit time may be specified by a predetermined direction of transition (e.g. rising edge) of each pulse on a separate clocking line.

Figure 3:
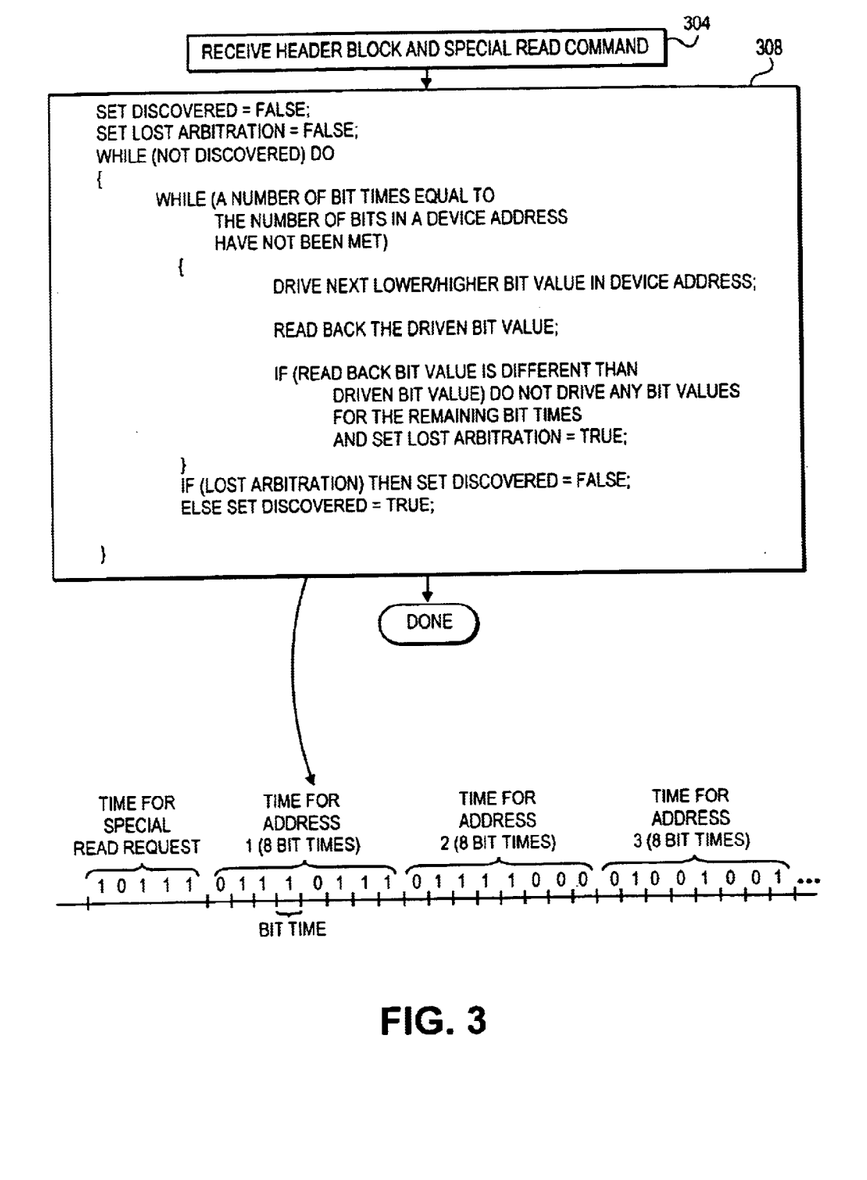
FIG. 3 depicts a flow diagram of operations in a responding device to identify itself as being connected to the bus.

FIG. 3 illustrates a flow diagram of operations performed in the message phase by every responding device that is connected to the line. Operation begins with block 304 in which the header block and the special read command are received by each responding device. Thereafter, each device attempts to write its device address on the line in response to the special read command. This is done by driving one or more of the bit values which define each respective device address on to the line. If, while writing a device address, the line fails to display any of the driven bit values of a victim device address, because another conflicting device is simultaneously writing its device address on the line in response to the same special read command, then the victim device recognizes this and stops writing its device address. The victim device has thus lost arbitration on the line, and doesn't write its address again until after the conflicting device has finished writing its device address. It is understood that every device address uniquely identifies its respective device such that no two devices will be successful in simultaneously writing their device addresses.

As a particular example of the foregoing operations performed by a responding device, the block 308 illustrates a program in which two variables are used for tracking the state of the device, Discovered and Lost Arbitration. In this example, there are two while loops that are performed. The outer one is performed while the device has not been discovered, i.e. while the device has not finished writing its device address on the line. The inner while loop is performed while a number of bit times, equal to the number of bits in a device address, have not elapsed. The main body of this inner loop includes two operations, namely driving the next lower or higher bit value in the device address and then reading back the driven bit value. If this read back bit value is different than the driven bit value, then no further bit values are driven for the remaining bit times that span a device address. In addition, the Lost Arbitration variable is set to be True, signifying that this device has lost arbitration. Since arbitration has now been lost, the Discovered variable is set to False when the inner loop is exited, so that the outer loop can be repeated. This is done until the device has left the inner loop without losing arbitration, and accordingly has been able to drive all of the bits in its device address, leading to the Discovered variable being set True which causes the device to exit from the outer while loop. The operations in block 308 are performed in each responding device that is connected to the bus, such that, as shown in the timeline of FIG. 3, device addresses are placed on the line one after the other.

Whenever any device finishes writing its device address, without losing arbitration, the device drives or presents a high impedance to the line for the duration of the bus discovery message phase, thereby allowing other devices to attempt and eventually finish writing their own addresses on the line. When all devices that are connected to the line have finished writing their device addresses, and accordingly all such devices present a high impedance to the line, the requesting device will detect the predetermined stop value which may be a reserved device address whose bit values are either all logic "1" or all logic "0", depending on the implementation. Detection of such a reserved device address signals the requesting device that the last device address has been obtained, such that all devices connected to the bus have been identified. A list containing all of these device addresses that have been read may now be returned to the rest of the system with a function identifier.

Figure 4:
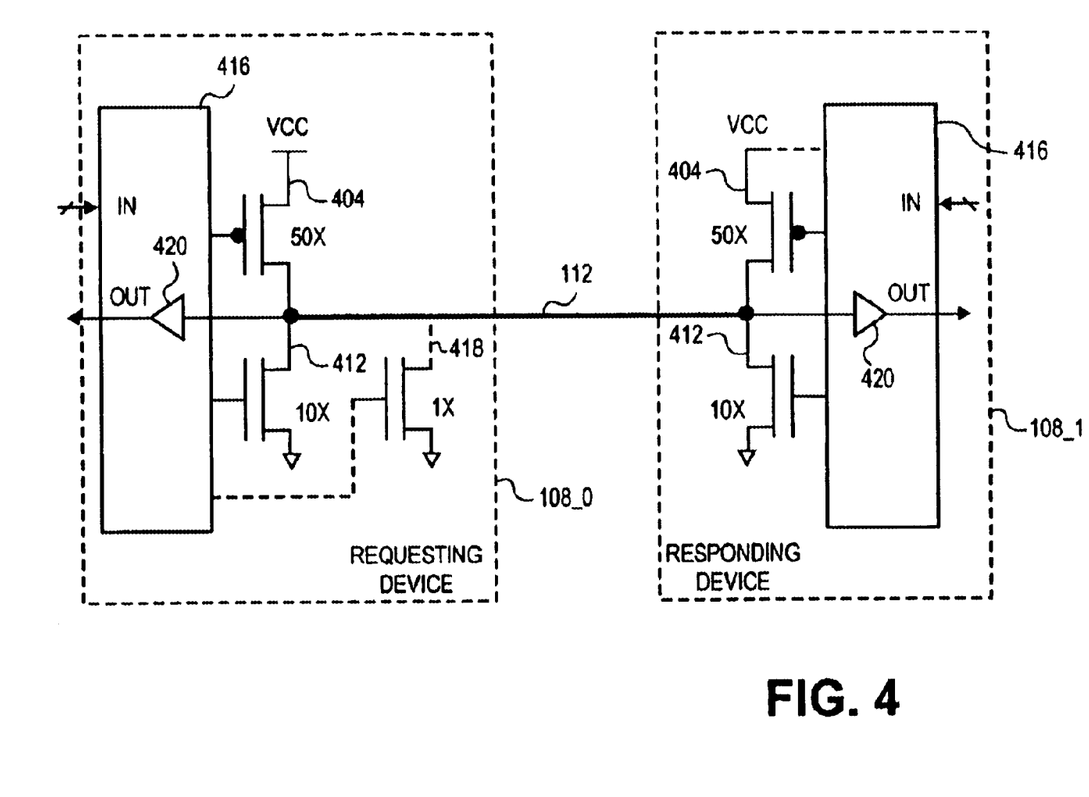
FIG. 4 shows an electrical circuit schematic of an exemplary mechanism used in requesting and responding devices, for driving a signal on a line of the bus.
Figure 5:
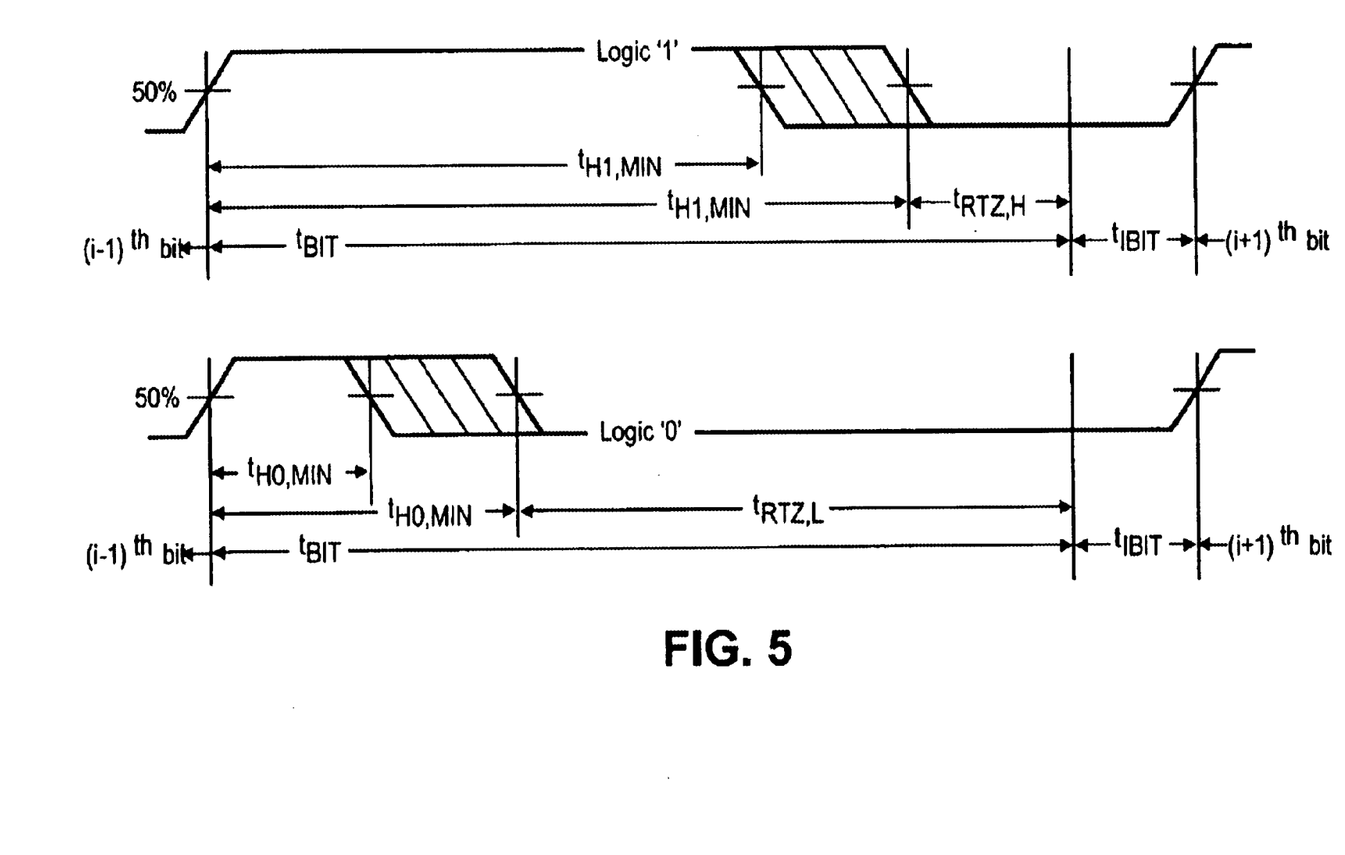
FIG. 5 depicts an example of a timing diagram for a write bit command, and also shows the timing for reading the bit value (e.g. 0 or 1).
Figure 6:
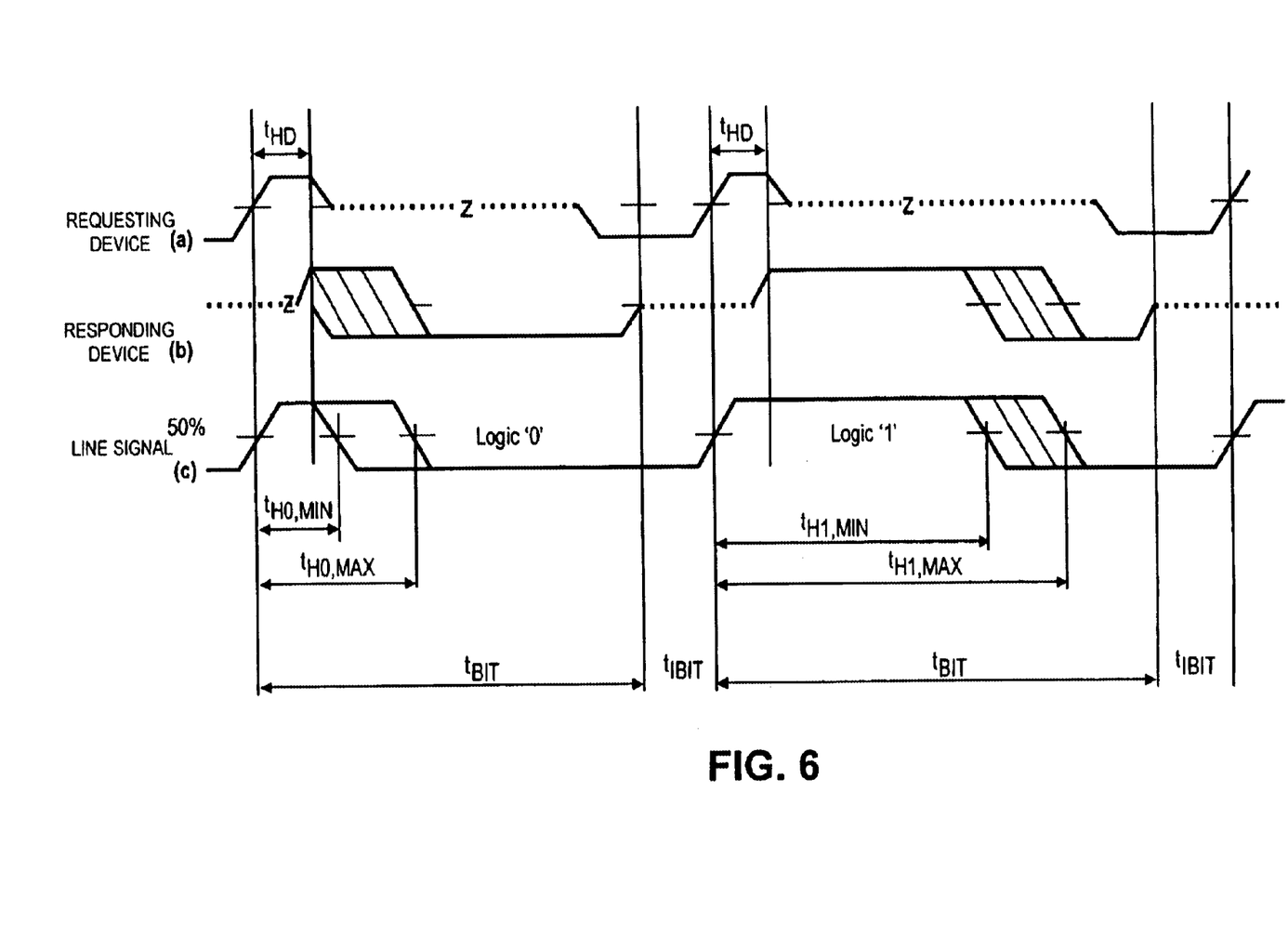
FIG. 6 illustrates an example of a timing diagram for a read bit command.

Turning now to FIG. 4, what's shown is a circuit schematic of portions of a requesting device 108_0 and a responding device such as 108_1 which directly interface with a line 112. Although this example shows a metal oxide semiconductor field effect transistor (MOSFET) implementation, any mechanical switch, relay or other semiconductor devices may be used so long as the electrical timing specifications in FIGS. 5 and 6 are met. The transistors 404 and 412 form part of an active switching circuit that may also include a switched idling transistor 418 in the requesting device 108_0 only. In addition, the listed drive strength of the p-channel transistors 404 relative to n-channel transistors 412 as being a factor of five is only exemplary. Once again, any inverter circuit that meets the electrical timing specifications in FIGS. 5 and 6 may be used.

In the exemplary bus driver circuitry shown in FIG. 4, a logic '1' is driven by controlling the inverter circuit to actively pull the line to a high voltage level. A logic '0' is driven by instructing the inverter circuit to actively pull the line to a low voltage level. As an alternative to this active pull up and pull down, the bus driver circuitry may have a resistor that is used to pull the line high, and the devices connected to the line have a transistor that is in an open-collector configuration and that can actively pull the bus low. In such an embodiment, a logic '1' is being driven by a device when that device simply stays open-collector, and a logic '0' is driven when the transistor in the device is turned on to actively pull the line down. In general, there may be a number of different bus driving schemes with different signal level assignments that can be used to implement the bus discovery protocol.

Each of the requesting and responding devices includes control logic 416 which can enable any transistor individually. A bus receiver circuit 420 is also provided to convert the signal on the line 112 into a digital MOS compatible signal that can exhibit only one of two logic states. Note that the idling transistor 418 is an optional device that provides a very weak low level drive, so as to prevent the line 112 from floating to unpredictable levels when idle. As an alternative, the idling transistor 418 may be replaced with a large resistor, or it may be deleted. In general, when the line 112 is being used for signaling a message, the idling transistor 418, if present, should be placed in cutoff. It is thus understood that when the requesting device 108_0 is to present a high impedance to the line 112, the transistors 404 and 412 are both in cutoff but transistor 418 may not be.

Although not shown in FIG. 4, each of the requesting device 108_0 and responding device 108_1 will have additional logic circuitry as an interface to higher level functionalities. For instance, the higher level functionalities may be implemented as part of a programmed microcontroller whose I/O ports are connected to the in and out ports of the control logic 416.

Turning now to FIG. 5, an electrical timing diagram for a device writing one bit on the line is illustrated. In this case, each write bit having a value of logic '1' or logic '0' abides by the timing shown in FIG. 5. In this example, it can be seen that if the bit is a logic '1' (top timing diagram), the originating device, be it the requesting device or a responding device, continues driving the line at a high voltage level for approximately ¾ of the bit time $t_{bit}$. On the other hand, if the bit is a logic '0', then the device drives the high voltage level for only ¼ of the bit time which is somewhere between $t_{HO,MIN}$ and $t_{HO,MAX}$. As mentioned earlier, the particular values shown in FIG. 5 are merely exemplary, such that, for instance, the logic values for the two timing diagrams may be interchanged so that logic '1' has the shorter pulse.

Referring now to FIG. 6, what is shown is an electrical timing diagram for a read bit, where the requesting device starts a bit time and the responding device(s) write a '0' or '1' on the line. The actual signal appearing on the line is the sum of the signals driven by the requesting device and by the one or more responding devices. There are three signals in FIG. 6: (a) requesting device driving, (b) responding device driving, and (c) signal displayed on the line at or near the responding device. The read bit timing diagram starts by the requesting device driving the bus line to a high voltage level for a predetermined time $t_{HD}$ while the other devices are not driving the line. The originator, in this case the requesting device, then releases the line, i.e. presents a high impedance to it, upon lapsing of $t_{HD}$. The responding devices, having recognized the read command, then hold the signal level at a high voltage following the timing rules as shown in FIG. 6. If the bit to be read is a logic '1', the responding device, according to signal (b), asserts a high level on the bus line for approximately ¾ of the bit time, between $t_{HI,MIN}$ and $t_{HI,MAX}$, followed by a low voltage level for ¼ of the bit time. On the other hand, if the bit to be read is a logic '0', the responding device asserts a high level on the line for ¼ of the bit time, between $t_{HO,MIN}$ and $t_{HO,MAX}$, followed by a low level for ¾ of the bit time. Note that the ¼–¾ values are merely exemplary as other values may alternatively be used.

Following each bit, the requesting device may delay the next bit in order to process information or respond to another task that may be unrelated to the obtaining of the device addresses. This delay is shown in FIGS. 5 and 6 as $t_{IBIT}$.

Note that in this embodiment of the invention, no bus contention appears when the responding devices are simultaneously asserting a logic '1'. In contrast, bus contention appears when one of the responding devices asserts a logic '0' simultaneously with another device asserting a logic '1'. When that happens, given the unbalanced nature of the drivers as mentioned above in connection with FIG. 4, the voltage on the line will be driven to a high level for at least $t_{HI,MIN}$ regardless of the responding device which is attempting to drive a logic '0' by pulling a low level on the line during the same time. When the responding device which is driving a logic '0' reads back the line signal level sometime approximately in the middle of $t_{BIT}$, it will fail to read back a logic '0' value and accordingly loses arbitration to the one or more devices that are writing a logic '1' at that time. One by one, as the different devices write their bits on the line, those devices which attempt to assert a logic '0' while another device simultaneously asserts a logic '1' will lose arbitration and will have to stop writing their device address. Such devices which lose arbitration present an immediate high impedance to the line and do not attempt to write the device address again until a predetermined number of $t_{BIT}$ times that define a single device address have lapsed.

Referring back to FIG. 1, another embodiment of the invention is disclosed in which an additional line 114 is provided as an event or side signal bus. This event line 114 is used for interrupting the system. The event line may be wire-ORed at each device that is connected to the line 114. A level sensitive signaling scheme may be used such that any one device may pull the line signal to a low level when it desires to interrupt the system. In response to detecting the low level on the event line 114, a host device on the line 114 may send a request to identify those devices that have events pending on the event line 114. This scheme thus allows multiple devices to assert a request for an interrupt on the event line, and then have these devices be identified using one of the embodiments of the bus discovery scheme described above. Once the host has determined the identity of the devices which have requested an interrupt, an interrupt routine or other software routine in the system may be executed to service the interrupt.

In another embodiment of the invention, the bus discovery scheme described in FIGS. 1–6 may be used to identify those devices that are connected to the line 112 and that need a device address to be assigned to them. In such an embodiment, there may be a mechanism in the system to detect the insertion of a device on the line 112. Such an event, when detected, could trigger the host device to send a request to identify all devices connected to the bus. The host device is preconfigured to recognize that certain reserved device addresses, such as a default address that is given to a device upon its manufacture, need to be reassigned by the system with a new device address.

The various system applications of the bus discovery methods and apparatuses described above include a computer system in which the devices that are connected to the line 112 could be one or more different types of asset management devices such as temperature sensors, chassis intrusion sensors, and fan speed indicators. Another example of an asset management device would be a system battery module that is responsible for managing the charging and power output of a battery that powers the computer system. Such an embodiment could be, for instance, a notebook computer. The requesting device in such an embodiment would be a power management controller that is also connected to the line 112. The power management controller would be connected to a high performance processor, program memory, and mass storage devices through means other than the line 112. A processor fan and temperature control module connected to the line 112, as a responding device, would verify proper operation of a fan and a temperature sensor, to help cool and sense the temperature of the high performance processor. The additional event line 114 could be used to allow the processor fan and temperature control module to alert the system if either the fan has malfunctioned or the processor temperature is too high.

To summarize, various embodiments of a method and apparatus for discovering devices on a line have been described. The technique features a bit level self arbitration scheme which causes any responding device that drives the line signal to a low level to lose arbitration if there is another device that is driving the line to a high level. The requesting device recognizes that all connected devices have responded when a device address having all bits being a predetermined stop value, e.g. logic '0', is detected.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for obtaining device addresses over a line of a bus, comprising:

sending a request, intended to read one or more device addresses, on the line, and then sending one or more sets of commands on the line, each set of commands being intended to read one device address;

attempting to write a first address on the line in response to the request, by a first device driving one or more of a plurality of first bit values, which define the first address, on the line in response to a first set of commands, respectively; and if, while writing the first address, the line fails to display any one of the driven plurality of first bit values, because a second device is simultaneously writing a second address on the line in response to the request, then the first device stops writing the first address and does not write the first address again until after the second device has finished writing the second address, the first and second addresses uniquely identifying the first and second devices.

2. The method of claim 1 further comprising:

finishing writing the second address and thereafter presenting a high impedance to the line by the second device; and then while the second device presents the high impedance, the first device finishing writing the first address and thereafter presenting a high impedance to the line.

3. The method of claim 2 further comprising:

returning a list, where the list includes the first and second addresses that were read on the line following the request, after reading on the line a last device address whose bit values are all equal to a predetermined stop value.

4. The method of claim 3 wherein the last device address appears on the line due to each device on the line, other than the requesting device, presenting a high impedance to the line in response to each one of a last set of commands.

5. The method of claim 1 wherein sending each command includes driving the line to a high voltage at the beginning of a bit time and then presenting a high impedance to the line at a predetermined time after the beginning of the bit time.

6. The method of claim 5 wherein, in response to detecting the high voltage on the line for each command, maintaining by the first device the high voltage for no more than a first predetermined interval in the bit time if a logic "0" is being driven, and a second predetermined interval, longer than the first interval, in the bit time if a logic "1" is being driven.

7. The method of claim 6 wherein if a logic "0" is being driven and, after the first predetermined interval has lapsed, the line displays the high voltage during the bit time, then the line is failing to display the driven logic "0".

8. A device to communicate over a bus line, comprising:

an active switching circuit to drive the line by subjecting the line to one of a high voltage, a low voltage, and a high impedance, in response to an input;

a receiver circuit to translate a signal on the line into one of two logic states at an output; and control logic coupled to the input of the active switching circuit to forward a request intended to read device addresses on the line, and then send a plurality of sets of commands on the line, each set of commands being intended to read one device address, the control logic being further coupled to the output of the receiver circuit to read one bit value of a device address after sending each command in a set, the device to return a list, where the list includes one or more device addresses that were read on the line following the request, after reading on the line a last device address whose bit values are all equal to a predetermined stop value.

9. The device of claim 8 wherein the active switching circuit has an inverter whose output is to subject the line to one of the high voltage, the low voltage, and the high impedance, in response to the input.

10. The device of claim 9 wherein the drive strengths of a pair of pull-up and pull-down transistors in the inverter are intentionally not balanced, so that bus contention on the line is resolved in favor of the pull-up transistor.

11. The device of claim 8 in combination with the bus.

12. The device of claim 11 wherein the bus is a serial, one line bus.

13. A device to communicate over a bus line, comprising:

an active switching circuit to drive the line by subjecting the line to one of a high voltage, a low voltage, and a high impedance, in response to an input;

a receiver circuit to translate a signal on the line into one of two logic states at an output; and control logic coupled to the output of the receiver circuit to receive (1) a request intended to read device addresses on the line, and (2) one or more sets of commands, each set of commands being intended to read one device address, the control logic being further coupled to the input of the active switching circuit to attempt to write a device address on the line in response to the request, by causing the active switching circuit to drive a plurality of bit values, which define the device address, on the line in response to a first one of the one or more sets of commands, and if, while writing the device address, the control logic fails to read back any one of the driven plurality of bit values, then the control logic loses arbitration, stops writing the device address and does not attempt to write the device address again until a second one of the one or more sets of commands is received.

14. The device of claim 13 wherein the control logic is to cause the active switching circuit to present a high impedance to the line as soon as the device has finished writing the device address without losing arbitration.

15. The device of 13 wherein the control logic is to detect each command when the receiver circuit detects a low to high voltage transition at the beginning of a bit time, and then causes the active switching circuit to present a high impedance to the line at a predetermined time after the beginning of the bit time.

16. The device of claim 15 wherein the control logic, in response to detecting each command, causes the active switching circuit to maintain the high voltage for no more than (1) a first predetermined interval in the bit time if a logic "0" is being driven, and (2) a second predetermined interval, longer than the first interval, in the bit time if a logic "1" is being driven.

17. The device of claim 16 wherein if a logic "0" is being driven and, after the first predetermined interval has lapsed, the control logic reads a logic "1" during the bit time, then the device is failing to read back the driven logic "0".

18. A computer system comprising:

a printed wiring board (PWB);

a serial bus having only one line, formed in the PWB;

a system battery module connected to the line;

a second device connected to the line; and a host device connected to the line to send a request, intended to read one or more device addresses, on the line, and then send one or more sets of commands on the bus, each set of commands being intended to read one device address, and wherein if the system battery module attempts to write a first device address on the line in response to the request, by driving one or more of a plurality of first bit values, which define the first device address, on the line in response to a first set of commands, respectively, and if, while writing the first address, the line fails to display any one of the driven plurality of first bit values, because the second device in the system is simultaneously writing a second address on the line in response to the request, then the system battery module stops writing the first device address and does not write the first device address again until after the second device has finished writing the second address, the first and second addresses uniquely identifying the system battery module and the second device.

19. The computer system of claim 18 wherein the second device is a processor temperature control module.

20. The computer system of claim 18 wherein the host device is to update a list, where the list includes one or more device addresses that were read on the line following the request, after reading on the line a last device address whose bit values are all equal to a predetermined stop value.

21. The computer system of claim 20 wherein the host device includes a programmed micro-controller configured to generate the request, the one or more sets of commands, and return the list in response to a function call made by device driver software in the system.

* * * * *